US012617204B2

(12) United States Patent
Kumazawa et al.

(10) Patent No.: US 12,617,204 B2
(45) Date of Patent: May 5, 2026

(54) COATING HEAD

(71) Applicant: Panasonic Intellectual Property Management Co., Ltd., Osaka (JP)

(72) Inventors: Kentaro Kumazawa, Osaka (JP); Shuhei Nakatani, Osaka (JP); Kazunobu Irie, Hyogo (JP); Futoshi Ohtsuka, Kyoto (JP); Yousuke Toyofuku, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 430 days.

(21) Appl. No.: 18/183,096

(22) Filed: Mar. 13, 2023

(65) Prior Publication Data

US 2023/0311509 A1 Oct. 5, 2023

(30) Foreign Application Priority Data

Mar. 30, 2022 (JP) ................................ 2022-057220

(51) Int. Cl.
*B41J 2/14* (2006.01)
*B41J 2/16* (2006.01)

(52) U.S. Cl.
CPC ......... *B41J 2/1433* (2013.01); *B41J 2/14233* (2013.01); *B41J 2/14274* (2013.01); *B41J 2/1607* (2013.01); *B41J 2/162* (2013.01); *B41J 2/1623* (2013.01); *B41J 2002/14258* (2013.01)

(58) Field of Classification Search
CPC .............................. B41J 2/1606; B41J 2/1433
See application file for complete search history.

(56) References Cited

U.S. PATENT DOCUMENTS

| | | | | |
|---|---|---|---|---|
| 2008/0055362 | A1 | 3/2008 | Irinoda | |
| 2014/0375725 | A1* | 12/2014 | Sameshima | B41J 2/1606 347/45 |
| 2018/0079209 | A1* | 3/2018 | Matsuo | B41J 2/1623 |
| 2019/0077152 | A1* | 3/2019 | Nakao | B41J 2/14233 |
| 2020/0180311 | A1 | 6/2020 | Nakayama | |
| 2020/0290357 | A1* | 9/2020 | Seki | B41J 2/1609 |
| 2021/0122161 | A1 | 4/2021 | Nakatani et al. | |

FOREIGN PATENT DOCUMENTS

| | | |
|---|---|---|
| JP | 2000-318166 | 11/2000 |
| JP | 2003-326703 | 11/2003 |
| JP | 2008-055828 | 3/2008 |
| JP | 2012-091352 | 5/2012 |
| JP | 2017-052171 | 3/2017 |
| JP | 2020-090054 | 6/2020 |
| JP | 2021-070313 | 5/2021 |

* cited by examiner

*Primary Examiner* — Xiao S Zhao
(74) *Attorney, Agent, or Firm* — Wenderoth, Lind & Ponack, L.L.P.

(57) ABSTRACT

A coating head includes: a plurality of nozzles; a plurality of pressure chambers communicating with the plurality of nozzles; an ink flow path communicating with the plurality of pressure chambers; and a coating layer that is at least partially provided on liquid contact surfaces of the plurality of nozzles, the plurality of pressure chambers, and the ink flow path.

11 Claims, 7 Drawing Sheets

COATING HEAD

BACKGROUND

1. Technical Field

The present disclosure relates to a coating head.

2. Description of the Related Art

In recent years, inkjet coating apparatuses have been used for manufacturing electronic devices such as liquid crystal panels and organic EL panels. Known examples of a coating head include a drop-on-demand coating head capable of ejecting a necessary amount of ink droplets to a coating object at necessary timing with high accuracy by high frequency driving (e.g., 50 kHZ). This type of coating head generally includes an ink flow path, a pressure chamber that is connected to the ink flow path and stores ink, a piezoelectric element (piezo element) that pressurizes the ink stored in the pressure chamber, a nozzle that communicates with the pressure chamber, and the like (e.g., see Unexamined Japanese Patent Publication No. 2003-326703). When the piezoelectric element is energized to pressurize the ink in the pressure chamber, ink droplets are discharged from the nozzle.

CITATION LIST

Patent Literature

PTL 1: Unexamined Japanese Patent Publication No. 2003-326703

SUMMARY

A coating head according to an aspect of the present disclosure includes a plurality of nozzles, a plurality of pressure chambers communicating with the plurality of nozzles, an ink flow path communicating with the plurality of pressure chambers, and a coating layer that is at least partially provided on liquid contact surfaces of the plurality of nozzles, the plurality of pressure chambers, and the ink flow path.

DETAILED DESCRIPTIONS

Figure 1:
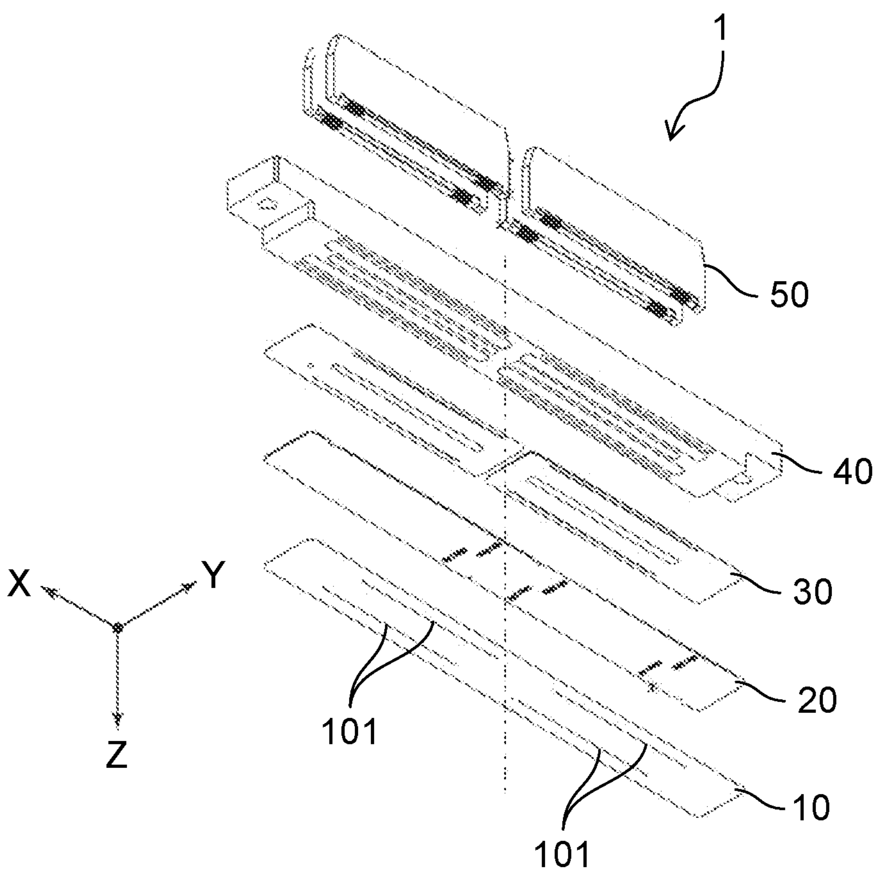
FIG. 1 is an exploded perspective view illustrating an appearance of a coating head according to an exemplary embodiment.

When an electronic device is manufactured using a coating apparatus, various materials need to be formed into ink, and may be formed into ink using a solvent with strong solubility. Ink containing such a solvent with strong solubility may dissolve a liquid contact part of a coating head. In particular, when the coating head is formed by stacking a plurality of plates and bonding the respective plates with an adhesive, an adhesive layer is exposed to the liquid contact surface, and thus causing the adhesive layer to be likely damaged by the solvent.

It is an object of the present disclosure to provide a coating head capable of improving resistance of a liquid contact surface to ink.

Hereinafter, coating head 1 according to an exemplary embodiment of the present disclosure will be described with reference to the drawings. Coating head 1 is a coating head of an ink circulation type. The present disclosure will be described using a rectangular coordinates system (X, Y, Z). The rectangular coordinates system includes a Z axis that has a positive direction in which coating head 1 discharges ink, an X axis along which nozzles 101 are arranged, and a Y axis along which the ink flows through an ink flow path (upstream individual flow path 103 and downstream individual flow path 104) connected to pressure chamber 102. Hereinafter, directions along the X axis, the Y axis, and the Z axis are referred to as an "X axis direction", a "Y axis direction", and a "Z axis direction", respectively.

Figure 2:
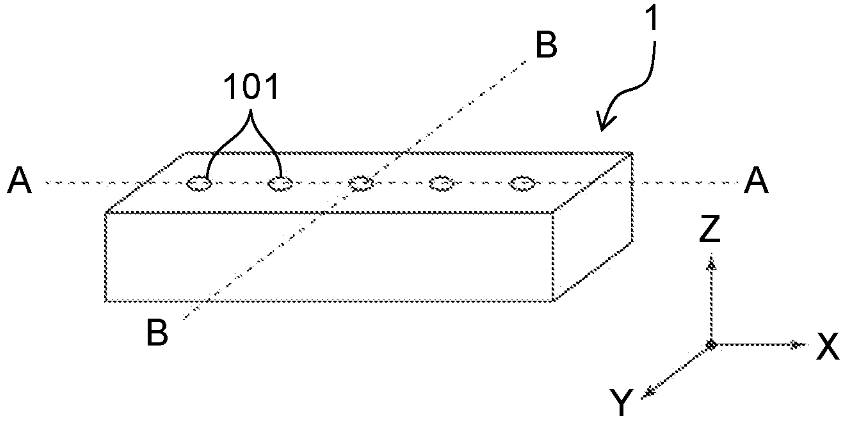
FIG. 2 is a diagram schematically illustrating a coating head according to an exemplary embodiment.
Figure 3:
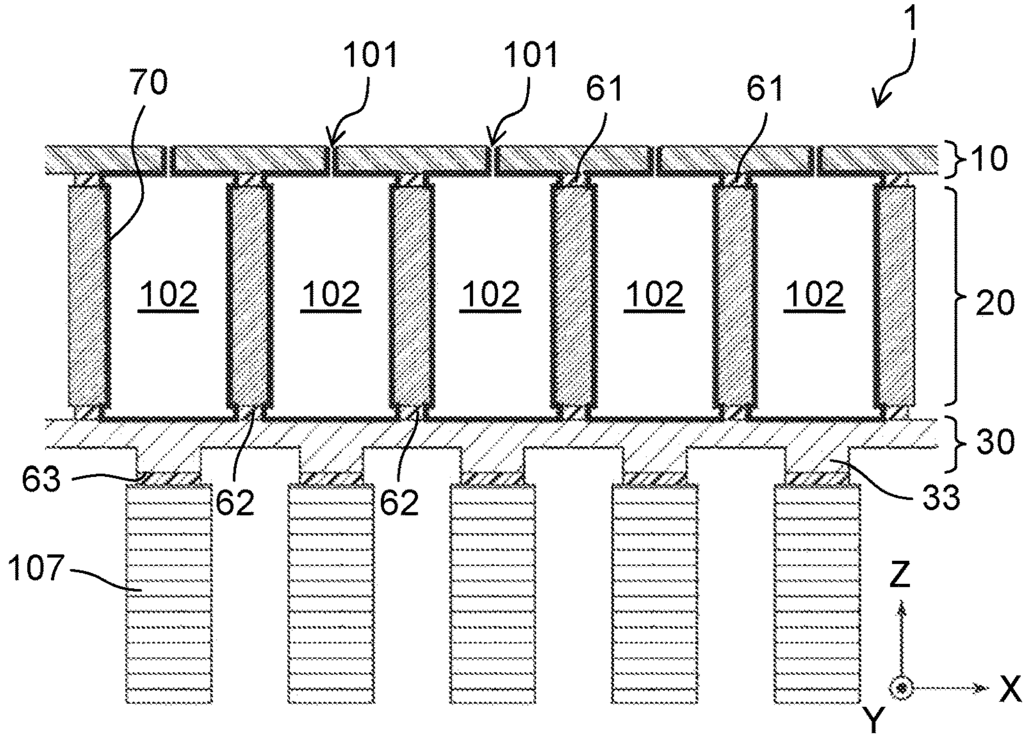
FIG. 3 is a sectional view schematically illustrating an example of an ink flow path in a coating head.
Figure 4:
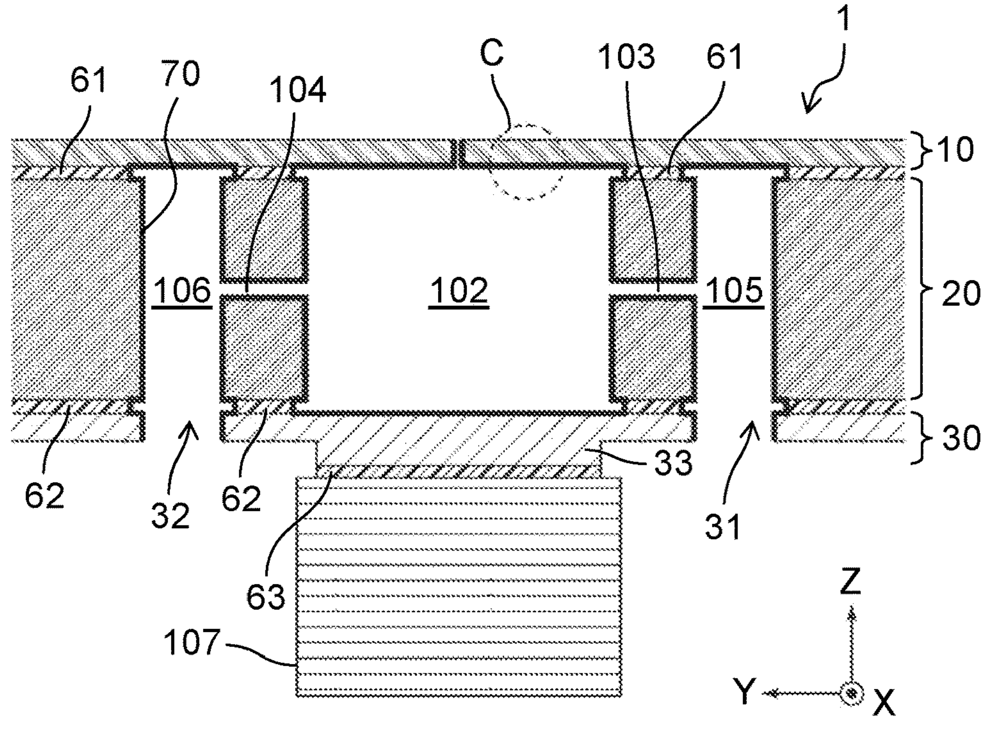
FIG. 4 is a sectional view schematically illustrating an example of an ink flow path in a coating head.

FIG. 1 is an exploded perspective view illustrating an appearance of coating head 1 according to an exemplary embodiment. FIG. 2 is a diagram schematically illustrating coating head 1 according to the exemplary embodiment. FIGS. 3 and 4 are each a sectional view schematically illustrating an ink flow path in coating head 1. FIG. 3 illustrates a section taken along line A-A in FIG. 2, and FIG. 4 illustrates a section taken along line B-B in FIG. 2.

As illustrated in FIGS. 3 and 4, coating head 1 includes nozzles 101, pressure chambers 102, upstream individual flow path 103, downstream individual flow path 104, upstream common flow path 105, downstream common flow path 106, piezoelectric elements 107, and the like. Nozzles 101, pressure chambers 102, upstream individual flow path 103, downstream individual flow path 104, upstream common flow path 105, and downstream common flow path 106 are formed inside nozzle plate 10, pressure chamber plate 20, vibration plate 30, and housing 40, or formed by bonding them.

As illustrated in FIG. 1, nozzle plate 10 is disposed with its plate surface orthogonal to the Z axis. Nozzle plate 10 is formed of a stainless steel plate formed by etching or press working, for example. The stainless steel plate has a thickness of 100 μm, for example.

Pressure chamber plate 20 has a rectangular parallelepiped shape, and is disposed on a negative side of nozzle plate 10 in the Z axis direction with its plate surface orthogonal to the Z axis. Pressure chamber plate 20 is sandwiched between vibration plate 30 and nozzle plate 10. Pressure chamber plate 20 is a laminate of the plurality of stainless steel plates formed by etching or press working, for example. Each of the stainless steel plates has a thickness in a range from 10 μm to 100 μm, inclusive, for example, and three to ten layers of the stainless steel plates are formed, for example.

Vibration plate 30 is disposed on a negative side of pressure chamber plate 20 in the Z axis direction with its plate surface orthogonal to the Z axis. Vibration plate 30 is sandwiched between housing 40 and pressure chamber plate 20. Vibration plate 30 is a thin film having a thickness in a range from 5 μm to 50 μm, inclusive, for example, and is formed by electroplating of nickel. Vibration plate 30 includes pressure receivers 33 that receive fluctuation of respective piezoelectric elements 107. Pressure receivers 33 are provided corresponding to respective pressure chambers 102, and are formed to protrude toward the negative side in the Z axis direction, for example.

Housing 40 has a rectangular parallelepiped shape and is disposed on a negative side of vibration plate 30 in the Z axis direction. Housing 40 has a thickness of 1 cm in the Z axis direction, for example. Housing 40 is formed by cutting alloy steel such as stainless steel, for example.

Pressure fluctuation unit 50 is disposed in a housing chamber (not illustrated) which is formed in Housing 40. Pressure fluctuation unit 50 includes piezoelectric element 107.

Nozzle plate 10 and pressure chamber plate 20, pressure chamber plate 20 and vibration plate 30, vibration plate 30 and housing 40, and vibration plate 30 and pressure fluctuation unit 50, are each bonded and fixed with an adhesive. Available examples of the adhesive include an epoxy-based adhesive having thermosetting characteristics. The adhesives for bonding the respective components may be identical or different.

As illustrated in FIGS. 3 and 4, first adhesive layer 61 is interposed between nozzle plate 10 and pressure chamber plate 20. Second adhesive layer 62 is interposed between pressure chamber plate 20 and vibration plate 30. First adhesive layer 61 and second adhesive layer 62 partially constitute pressure chamber 102, upstream common flow path 105, and downstream common flow path 106. That is, first adhesive layer 61 and second adhesive layer 62 each serve as a liquid contact surface in the ink flow path. Each of first adhesive layer 61 and second adhesive layer 62 contains an organic substance and is likely to be dissolved in the ink, and thus is said to be a part that is particularly required to be protected by coating layer 70. Third adhesive layer 63 is interposed between vibration plate 30 and piezoelectric element 107.

A plurality of nozzles 101 are drilled in nozzle plate 10 along the X axis. Nozzle 101 is a hole passing through nozzle plate 10 in the Z axis direction. An ink droplet is discharged to the outside through nozzle 101. Nozzle 101 has a diameter in a range from 3 μm to 100 μm, inclusive. Nozzles 101 may be disposed in one row or in a plurality of rows along the X axis. FIG. 1 illustrates nozzles 101 that are disposed in two rows along the X axis. When nozzles 101 are disposed in a plurality of rows, pressure chamber 102, upstream individual flow path 103, downstream individual flow path 104, upstream common flow path 105, and downstream common flow path 106 are provided for each nozzle row.

Pressure chamber 102 is formed by closing an open surface (a surface on a negative side in the Z axis direction) of a recess formed in pressure chamber plate 20 with vibration plate 30. Pressure chamber 102 is an ink storage space that stores ink. Pressure chamber 102 is provided for each of the plurality of nozzles 101 on a one-to-one basis and communicates with nozzle 101. Pressure chamber 102 has a rectangular parallelepiped shape extending along the Y axis, for example. Pressure chamber 102 may be provided on its inner surface with a step.

Upstream individual flow path 103 is disposed upstream of pressure chamber 102 in an ink flow direction to allow pressure chamber 102 to communicate with upstream common flow path 105. Upstream individual flow path 103 is provided for each of the plurality of pressure chambers 102 on a one-to-one basis.

Downstream individual flow path 104 is disposed downstream of pressure chamber 102 in the ink flow direction to allow pressure chamber 102 to communicate with downstream common flow path 106. Downstream individual flow path 104 is provided for each of the plurality of pressure chambers 102 on a one-to-one basis.

Upstream common flow path 105 is an ink storage space disposed upstream of upstream individual flow path 103 in the ink flow direction. Upstream common flow path 105 is provided in common to the plurality of upstream individual flow paths 103. Upstream common flow path 105 communicates with an ink supply path (not illustrated) formed in housing 40 through opening 31 formed in vibration plate 30.

Downstream common flow path 106 is an ink storage space disposed downstream of downstream individual flow path 104 in the ink flow direction. Downstream common flow path 106 is provided in common to the plurality of downstream individual flow paths 104. Downstream common flow path 106 communicates with an ink ejection path (not illustrated) formed in housing 40 through opening 32 formed in vibration plate 30.

Piezoelectric element 107 is provided corresponding to each of the plurality of pressure chambers 102, and is in contact with pressure receiver 33 of vibration plate 30. Piezoelectric element 107 is deformed to expand and contract in the Z axis direction, for example, when voltage is applied to piezoelectric element 107. For example, a stacked piezo actuator of a D33 mode is applied to piezoelectric element 107.

Coating head 1 is configured such that ink supplied from an external ink supply tank (not illustrated) through an ink supply path (not illustrated) of housing 40 is supplied to pressure chamber 102 through upstream common flow path 105 and upstream individual flow path 103, and is discharged from an ink discharge path (not illustrated) through downstream individual flow path 104 and downstream common flow path 106. The discharged ink is circulated to the ink supply tank using a circulation pump (not illustrated), for example. When the ink is circulated without remaining in this manner, the ink can be prevented from remaining in pressure chamber 102 or nozzle 101 and causing nozzle clogging.

Coating head 1 of an ink circulation type includes an ink supply tank (not illustrated) connected to an ink supply path (not illustrated). Pressure of the ink supply tank is set higher than pressure of an ink discharge tank (not illustrated) connected to an ink discharge path (not illustrated). For example, difference in pressure can be controlled by changing positions in the Z axis direction (height with reference to pressure chamber 102) of the ink supply tank and the ink discharge tank. Alternatively, internal pressure of the ink supply tank and the ink discharge tank may be individually controlled by a regulator, for example.

When voltage is applied to piezoelectric element 107 in coating head 1, piezoelectric element 107 is deformed and extended in the Z axis direction, for example, and then vibration in the Z axis direction is transmitted to pressure receiver 33 of vibration plate 30. As a result, vibration plate 30 is deformed to cause pressure fluctuation in the ink stored in pressure chamber 102. This pressure fluctuation propagating toward nozzle 101 causes an ink droplet to be discharged from nozzle 101.

The present exemplary embodiment includes coating layer 70 that is provided on all of liquid contact surfaces of nozzle 101, pressure chamber 102, upstream individual flow path 103, downstream individual flow path 104, upstream common flow path 105, and downstream common flow path 106. Providing coating layer 70 enables preventing nozzle 101, pressure chamber 102, and the ink flow path from being dissolved by the ink, the ink flow path including upstream individual flow path 103, downstream individual flow path 104, upstream common flow path 105, and downstream common flow path 106. For the ink, a solvent with strong solubility, such as N, N-dimethylformamide CAS 68-12-2, is typically used.

Coating layer 70 is required to have chemical resistance to dissolution caused by ink, high adhesiveness to a base such as nozzle plate 10, and high wettability (e.g., a contact angle less than or equal to 30°). These properties can be achieved by forming coating layer 70 with a layered structure, for example.

Figure 5A:
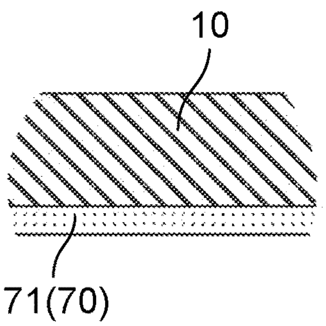
FIG. 5A is a diagram illustrating an example of a coating layer.
Figure 5B:
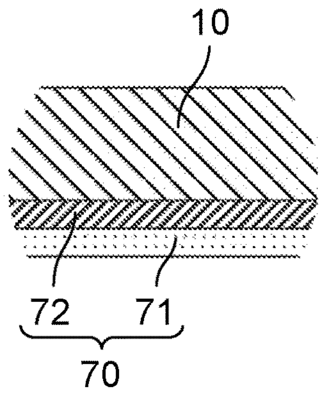
FIG. 5B is a diagram illustrating another example of a coating layer.
Figure 5C:
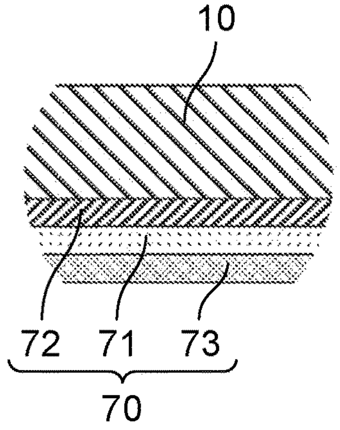
FIG. 5C is a diagram illustrating yet another example of a coating layer.

FIGS. 5A to 5C are each a diagram illustrating an example of structure of coating layer 70. FIGS. 5A to 5C each illustrate a part surrounded by broken line C in FIG. 4 in an enlarged manner.

FIG. 5A illustrates coating layer 70 with a single layer structure. Coating layer 70 includes first coating layer 71 formed of a material having high chemical resistance to dissolution caused by ink. First coating layer 71 is a resin film, a metal film, or a metal oxide film, for example. For the resin film, a parylene resin is suitable, for example. For the metal film, gold is suitable, for example. For the metal oxide film, alumina, titanium oxide, niobium oxide, tartar oxide, or silicon oxide is suitable, for example.

In particular, first coating layer 71 being a metal oxide film enables thin film coating of several atomic layers, so that pressure chamber 102 changes little in dimension. Additionally, variations in film thickness can be reduced in a film forming process. Thus, discharge performance among the plurality of nozzles 101 provided corresponding to the plurality of pressure chambers 102 is stabilized.

FIG. 5B illustrates coating layer 70 with a two-layer structure. Coating layer 70 having a two-layer structure includes not only first coating layer 71 formed of a material having high chemical resistance, but also second coating layer 72 that has higher adhesiveness to a base (nozzle plate 10 in FIG. 5B) than first coating layer 71 and that is provided in a lowermost layer in contact with the base. When the base is formed of stainless steel, titanium oxide is suitable for second coating layer 72, for example.

When a coating material or a film forming process is determined to prevent dissolution caused by ink, adhesiveness to a base is sacrificed, and thus coating layer 70 may peel over time. When coating layer 70 is formed with a two-layer structure, and second coating layer 72 having high adhesiveness to the base is provided in a lowermost layer, coating layer 70 can be easily prevented from peeling.

When coating layer 70 with a two-layer structure includes first coating layer 71 with high adhesiveness to the base, third coating layer 73 having high wettability may be formed on a surface layer of first coating layer 71 serving as a lowermost layer.

FIG. 5C illustrates coating layer 70 with a three-layer structure. Coating layer 70 with a three-layer structure includes not only first coating layer 71 and second coating layer 72, but also third coating layer 73 with a larger surface tension than the ink as an outermost layer. Third coating layer 73 has higher wettability than second coating layer 72, and thus reducing a contact angle with the ink. Third coating layer 73 has a contact angle of less than or equal to 30°, preferably less than or equal to 10°. Providing third coating layer 73 enables a contact angle with a liquid contact surface to be easily reduced.

FIGS. 6A to 6D and FIGS. 7A to 7D are each a transition view illustrating a state when the ink flow path in coating head 1 is filled with ink 111. FIGS. 7A to 7D each illustrate coating head 1 in which coating layer 70 with higher wettability than that of coating head 1 illustrated in FIGS. 6A to 6D is used.

Figure 6A:
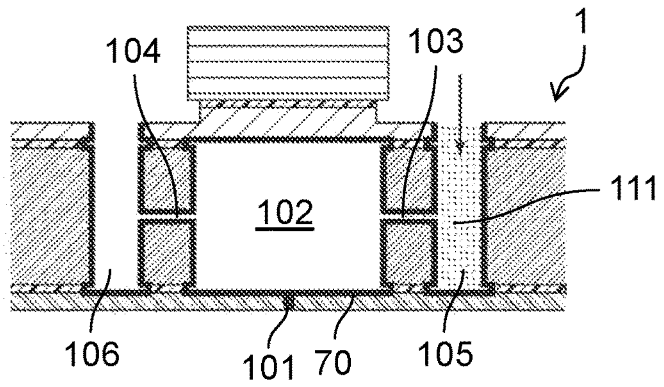
FIG. 6A is a transition diagram illustrating an example of a state in which ink is introduced into an ink flow path.
Figure 6B:
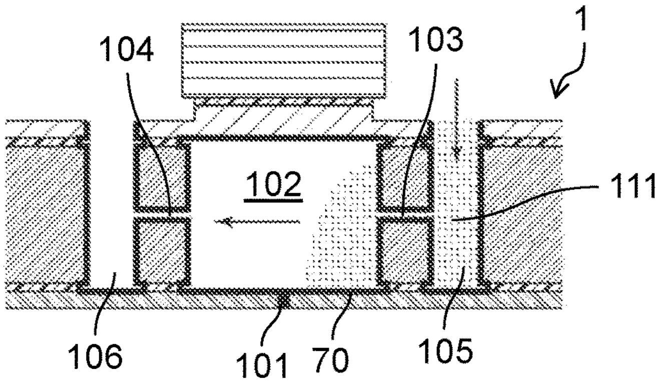
FIG. 6B is a transition diagram illustrating an example of a state in which ink is introduced into an ink flow path.
Figure 6C:
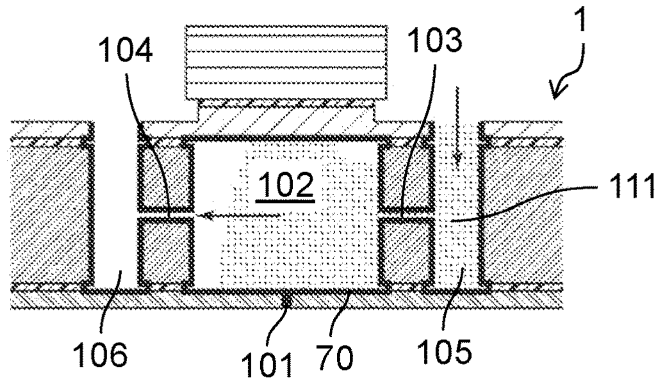
FIG. 6C is a transition diagram illustrating an example of a state in which ink is introduced into an ink flow path.
Figure 6D:
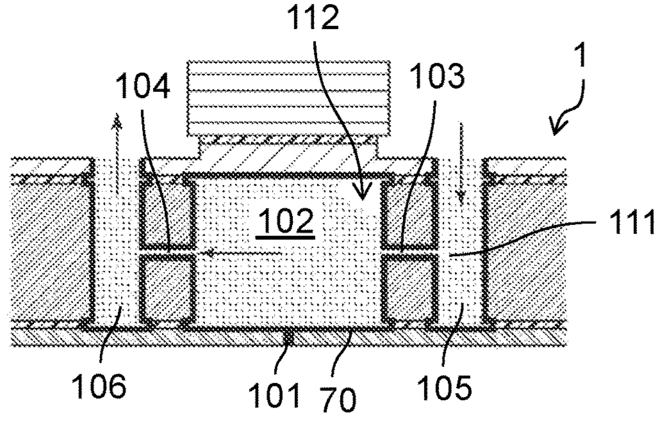
FIG. 6D is a transition diagram illustrating an example of a state in which ink is introduced into an ink flow path.

When coating layer 70 has low wettability (e.g., a contact angle is 90°), ink 111 supplied from a supply tank (not illustrated) flows into pressure chamber 102 through upstream common flow path 105 and upstream individual flow path 103 (see FIG. 6A). Ink 111 flows along a liquid contact surface of pressure chamber 102. At this time, ink 111 flows mainly by external pressure due to a large contact angle with coating layer 70, and thus does not wet and spread on the liquid contact surface (see FIG. 6B). As a result, pressure chamber 102 has a corner that is not filled with ink 111 (see FIG. 6C), and thus bubbles 112 remain in pressure chamber 102 (see FIG. 6D). When bubbles 112 are mixed into pressure chamber 102, pressure fluctuation in pressure chamber 102 is reduced by bubbles 112, and thus ejection failure of ink 111 may occur.

Figure 7A:
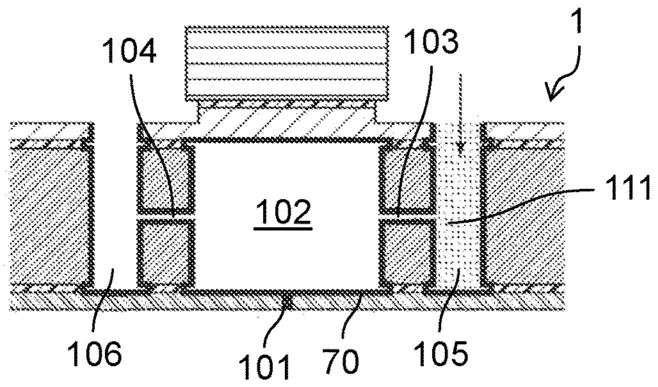
FIG. 7A is a transition diagram illustrating another example of a state in which ink is introduced into an ink flow path.
Figure 7B:
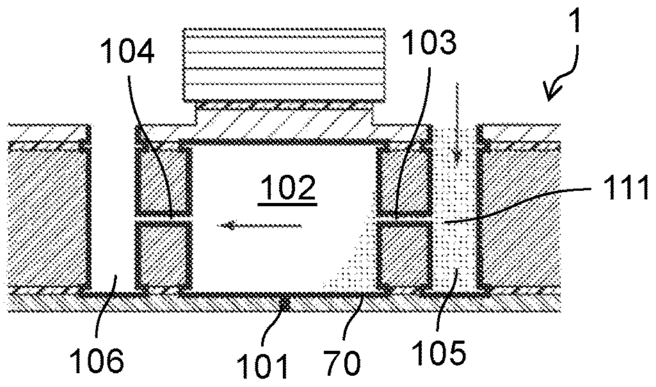
FIG. 7B is a transition diagram illustrating another example of a state in which ink is introduced into an ink flow path.
Figure 7C:
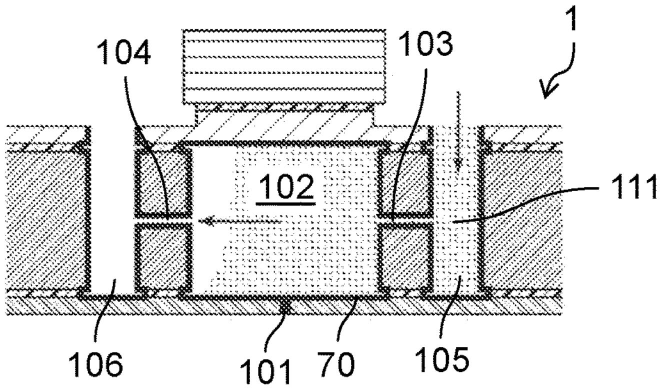
FIG. 7C is a transition diagram illustrating another example of a state in which ink is introduced into an ink flow path.
Figure 7D:
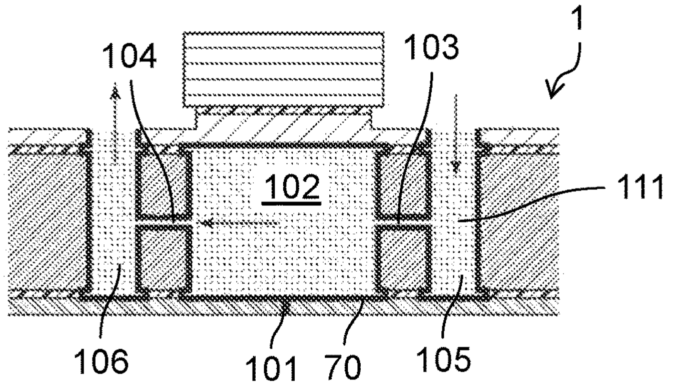
FIG. 7D is a transition diagram illustrating another example of a state in which ink is introduced into an ink flow path.

In contrast, when coating layer 70 has high wettability (e.g., a contact angle is less than or equal to 10°), ink 111 supplied from a supply tank (not illustrated) flows into pressure chamber 102 through upstream common flow path 105 and upstream individual flow path 103 (see FIG. 7A). Ink 111 flows along a liquid contact surface of pressure chamber 102. At this time, ink 111 flows mainly by force caused by wet-spreading due to a small contact angle with coating layer 70, and thus wets and spreads on the liquid contact surface (see FIG. 7B). As a result, the ink is filled without any void in pressure chamber 102 including the corner of pressure chamber 102 (see FIG. 7C), and thus bubbles 112 do not remain in pressure chamber 102 (see FIG. 7D). Thus, discharge quality of ink 111 is improved. When ink 111 flows into pressure chamber 102 from upstream individual flow path 103, ink 111 smoothly flows into pressure chamber 102 without interference caused by surface tension of a liquid surface of ink 111.

Figure 8:
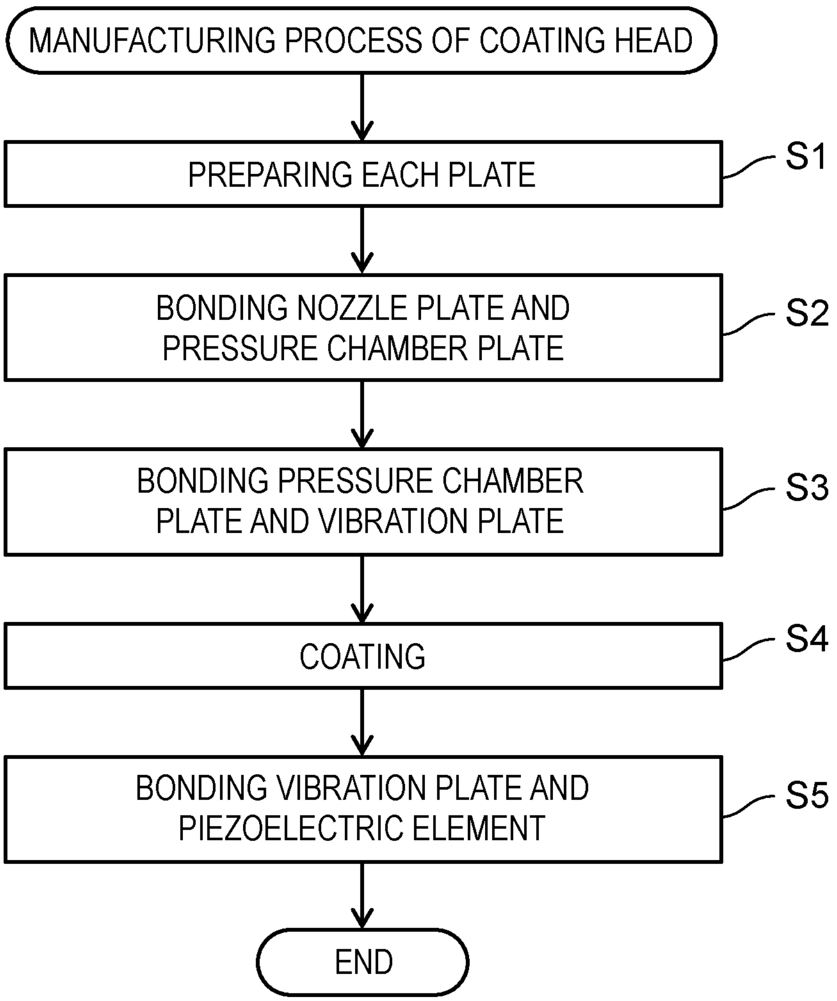
FIG. 8 is a flowchart illustrating an example of a manufacturing process of a coating head.

FIG. 8 is a flowchart illustrating an example of a manufacturing process of coating head 1.

First, individual plates 10 to 30 are prepared in step S1. For example, nozzle plate 10 is prepared by forming a water-repellent film on a nozzle surface (surface on the positive side in the Z-axis direction), and then forming a nozzle hole in the nozzle surface. Pressure chamber plate 20 is prepared by stacking and bonding a plurality of plates that are each provided with an opening to be an ink flow path.

In subsequent step S2, nozzle plate 10 and pressure chamber plate 20 are bonded with an adhesive. Between nozzle plate 10 and pressure chamber plate 20, first adhesive layer 61 is formed (see FIGS. 3 and 4).

In subsequent step S3, a bonded body of nozzle plate 10 and pressure chamber plate 20, and vibration plate 30 are bonded with an adhesive. Between pressure chamber plate 20 and vibration plate 30, second adhesive layer 62 is formed (see FIGS. 3 and 4).

In subsequent step S4, coating layer 70 is formed on a bonded body of nozzle plate 10, pressure chamber plate 20, and vibration plate 30. For forming coating layer 70, atomic layer deposition (ALD) is suitable, for example. Coating layer 70 is formed on a surface of an ink flow path formed by nozzle plate 10, pressure chamber plate 20, and vibration plate 30. Using the ALD allows a coating material to enter the ink flow path that is a narrow space, and enables coating layer 70 to be formed with a uniform thickness. After nozzle plate 10, pressure chamber plate 20, and vibration plate 30 are bonded, a coating step is performed. Thus, coating layer 70 is also formed on surfaces of first adhesive layer 61 and second adhesive layer 62.

After the coating is completed, the bonded body of nozzle plate 10, pressure chamber plate 20, and vibration plate 30 is bonded to piezoelectric element 107 with an adhesive in step S5. Between vibration plate 30 and piezoelectric element 107, third adhesive layer 63 is formed (see FIGS. 3 and 4).

Steps S2, S3 are performed in no particular order. In steps S2, S3, the plates may be bonded by metal diffusion bonding instead of bonding with an adhesive.

As described above, coating head 1 according to the exemplary embodiment includes a plurality of nozzles 101, a plurality of pressure chambers 102 communicating with the plurality of nozzles 101, ink flow paths (upstream common flow path 105, upstream individual flow path 103, downstream individual flow path 104, and downstream common flow path 106) communicating with the plurality of pressure chambers 102, piezoelectric element 107 that is deformed by energization to pressurize ink in pressure chamber 102, and coating layer 70 that is at least partially provided on liquid contact surfaces of nozzle 101, pressure chamber 102, and the ink flow paths. This configuration causes a part covered with coating layer 70 to be improved in resistance of the liquid contact surfaces to ink 111, and thus improving reliability of coating head 1.

Coating layer 70 in coating head 1 may include first coating layer 71 formed of a metal oxide. This configuration enables the resistance of the liquid contact surfaces to ink 111 to be easily improved. This configuration also enables thin film coating of several atomic layers, so that pressure chamber 102 changes little in dimension, and variations in film thickness can be reduced in a film forming process. Thus, discharge performance among nozzles 101 is stabilized.

Coating layer 70 in coating head 1 also may have a layered structure including a plurality of layers. This configuration enables coating layer 70 to be designed in consideration of not only chemical resistance to ink 111 but also adhesiveness to a base and wettability of ink 111.

Coating layer 70 in coating head 1 includes second coating layer 72 (lowermost layer) that may have the highest adhesiveness to the liquid contact surfaces among the plurality of layers. This configuration enables coating layer 70 to be prevented from peeling from the base over time.

Coating layer 70 in coating head 1 includes third coating layer 73 (outermost layer) that may have the highest wettability among the plurality of layers. Specifically, third coating layer 73 (outermost layer) has a contact angle of less than or equal to 10° with ink 111, and thus enables ink 111 to smoothly flow into and fill pressure chamber 102. As a result, defects due to remaining of bubbles 112 in pressure chamber 102 can be prevented.

Coating head 1 can be formed by stacking and bonding nozzle plate 10, pressure chamber plate 20, and vibration plate 30, and includes first adhesive layer 61 interposed between nozzle plate 10 and pressure chamber plate 20, and second adhesive layer 62 interposed between pressure chamber plate 20 and vibration plate 30, first adhesive layer 61 and second adhesive layer 62 not only being able to form a part of the liquid contact surfaces, but also being able to be covered with coating layer 70. This configuration enables protecting an adhesive part that is more easily dissolved in ink 111 than the plates.

Although the disclosure made by the inventors of the present disclosure has been specifically described above on the basis of the exemplary embodiment, the present disclosure is not limited to the above exemplary embodiment, and can be modified without departing from the spirit of the present disclosure.

For example, coating layer 70 may be partially provided in a part formed of a material that is easily dissolved by ink 111 instead of all of the liquid contact surfaces. For example, when nozzle plate 10 and pressure chamber plate 20 are formed of stainless steel, and vibration plate 30 is formed with nickel plating, only a liquid contact surface of vibration plate 30 may be easily dissolved depending on a type of ink 111.

Figure 9:
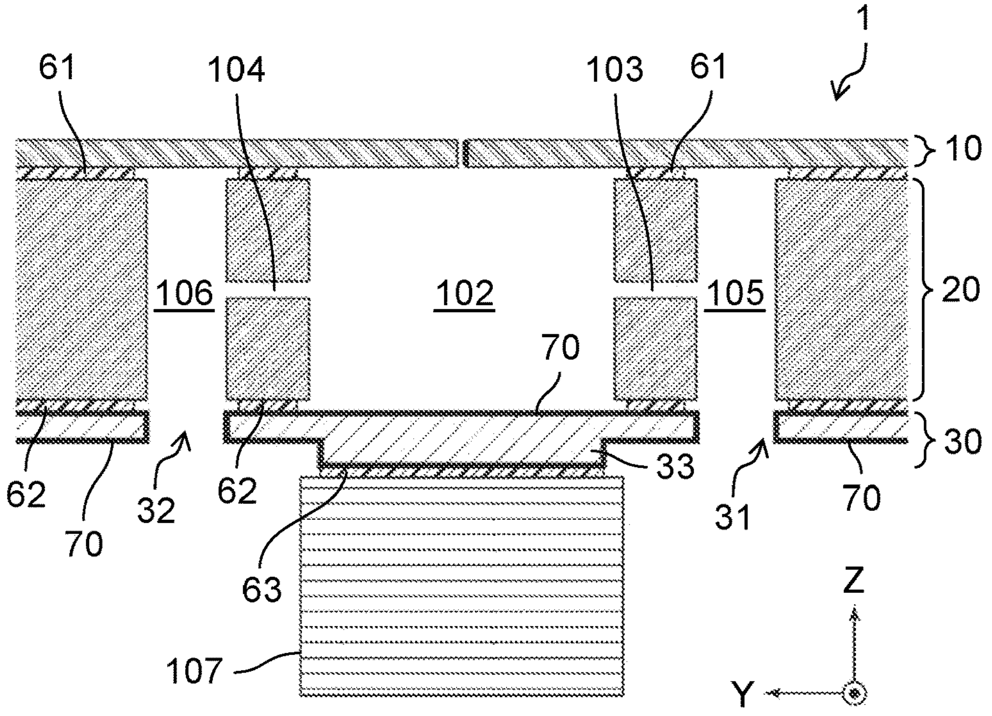
FIG. 9 is a sectional view schematically illustrating another example of an ink flow path in a coating head.

In this case, coating layer 70 may be provided only on the liquid contact surface of vibration plate 30. FIG. 9 illustrates an example in which coating layer 70 is provided on all surfaces of vibration plate 30. Coating layer 70 can be formed before adhesion between the plates, so that the manufacturing process is facilitated. When coating layers 70 are formed on both surfaces of vibration plate 30, vibration plate 30 can be reliably prevented from being dissolved by ink 111. This configuration prevents vibration plate 30 from being damaged to cause conductive ink 111 to come into contact with piezoelectric element 107, so that a short-circuit accident or the like can be prevented in advance, and safety is improved. When adhesiveness between coating layer 70 and adhesive is poor, coating layer 70 may not be formed in a part where second adhesive layer 62 and third adhesive layer 63 are formed.

Figure 10:
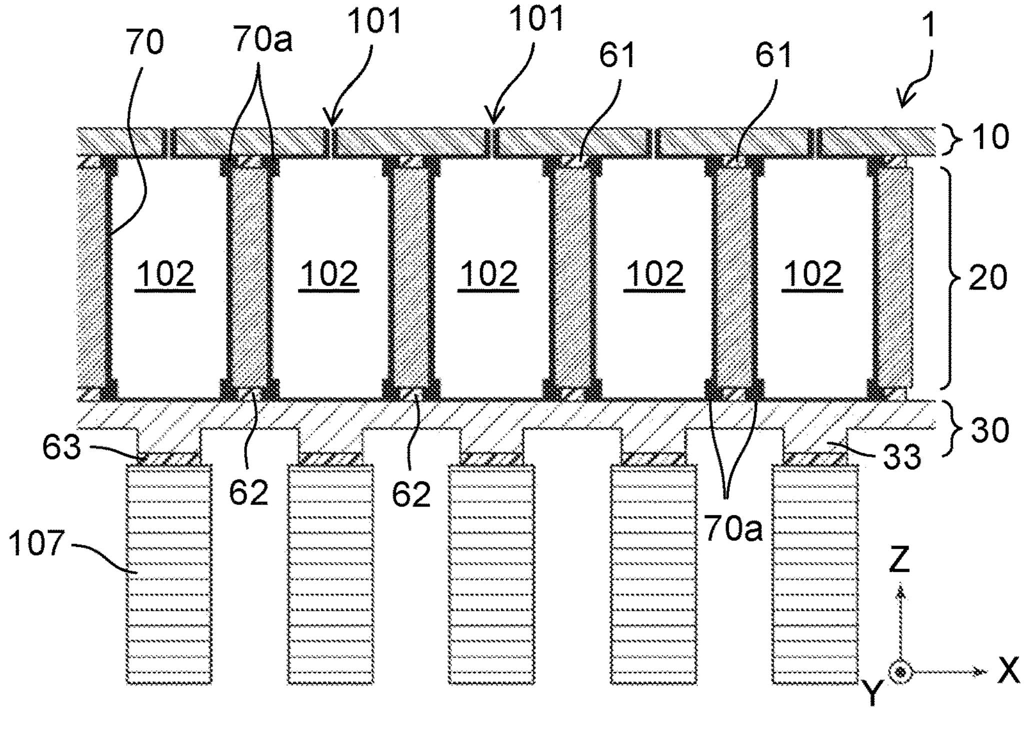
FIG. 10 is a sectional view schematically illustrating yet another example of an ink flow path in a coating head.

For example, when first adhesive layer 61 and second adhesive layer 62 are covered with coating layer 70 as illustrated in FIG. 10, coating layer 70 may include parts 70*a* corresponding to first adhesive layer 61 and second adhesive layer 62, parts 70*a* being thicker than other parts. This configuration enables an adhesive part that is most easily dissolved in ink 111 to be more reliably protected.

Coating layer 70 may include an outermost layer that is provided with fine irregularities to reduce a contact angle. The present disclosure can be applied not only to a coating head of a circulation type described in the exemplary embodiment but also to a coating head of a non-circulation type.

The exemplary embodiment disclosed herein should be regarded as being exemplary and nonrestrictive in every aspect. The scope of the present disclosure is represented by the scope of claims instead of the above description, and is intended to involve meaning equivalent to the scope of claims and all modifications within the scope.

The aspect of the present disclosure enables improvement in resistance of a liquid contact surface to ink 111.

The present disclosure is widely applicable to a coating head and a coating apparatus including the coating head.

What is claimed is:

1. A coating head comprising:
- a plurality of nozzles;
- a plurality of pressure chambers communicating with the plurality of nozzles;
- an ink flow path communicating with the plurality of pressure chambers; and
- a coating layer that is at least partially provided on liquid contact surfaces of the plurality of nozzles, the plurality of pressure chambers, and the ink flow path,
- wherein the coating head is formed by stacking and bonding a nozzle plate, a pressure chamber plate, and a vibration plate,
- the coating head further comprising:
- a first adhesive layer interposed between the nozzle plate and the pressure chamber plate; and
- a second adhesive layer interposed between the pressure chamber plate and the vibration plate,
- wherein the first adhesive layer and the second adhesive layer form a part of the liquid contact surfaces, and are covered with the coating layer, and
- wherein the coating layer includes protruding portions at locations corresponding to the first adhesive layer and the second adhesive layer, the protruding portions of the coating layer being thicker than other portions of the coating layer, and protruding from the coating layer in a direction away from the first adhesive layer and the second adhesive layer.

2. The coating head according to claim 1, wherein the coating layer includes a layer formed of a metal oxide.

3. The coating head according to claim 1, wherein the coating layer has a layered structure including a plurality of layers.

4. The coating head according to claim 3, wherein the coating layer includes a lowermost layer that has a highest adhesiveness to the liquid contact surfaces among the plurality of layers.

5. The coating head according to claim 3, wherein the coating layer includes an outermost layer that has a highest wettability among the plurality of layers.

6. The coating head according to claim 5, wherein the outermost layer has a contact angle of less than or equal to 10 degrees with ink.

7. The coating head according to claim 1, wherein the coating layer is provided on all the liquid contact surfaces of the plurality of nozzles, the plurality of pressure chambers, and the ink flow path.

8. The coating head according to claim 1, wherein the coating layer is a parylene resin film.

9. The coating head according to claim 1, wherein the coating layer is a metal film of gold.

10. The coating head according to claim 1, wherein the coating layer is a metal film of niobium oxide.

11. The coating head according to claim 1, wherein an outermost layer of the coating layer is provided with irregularities.

* * * * *